(12) United States Patent
Meline (10) Patent No.: US 11,659,831 B2
(45) Date of Patent: May 30, 2023

(54) ELK CALL WITH INTERNAL CHAMBER

(71) Applicant: Ralph Meline, Coos Bay, OR (US)

(72) Inventor: Ralph Meline, Coos Bay, OR (US)

( * ) Notice: Subject to any disclaimer, the term of this patent is extended or adjusted under 35 U.S.C. 154(b) by 0 days.

(21) Appl. No.: 15/980,742

(22) Filed: May 16, 2018

(65) Prior Publication Data
US 2023/0021471 A1 Jan. 26, 2023

(51) Int. Cl.
*A01M 31/00* (2006.01)

(52) U.S. Cl.
CPC .................... *A01M 31/004* (2013.01)

(58) Field of Classification Search
CPC .................................... A01M 31/004
USPC ................................. 446/202, 209
See application file for complete search history.

(56) References Cited

U.S. PATENT DOCUMENTS

| | | | | |
|---|---|---|---|---|
| 3,772,823 A * | 11/1973 | Herter | ........... | A01M 31/004 446/209 |
| 4,335,539 A * | 6/1982 | Jones | ........... | A63H 5/00 446/486 |
| 4,976,648 A * | 12/1990 | Meline | ........... | A01M 31/004 144/248.7 |
| 5,122,088 A * | 6/1992 | Meline | ........... | A01M 31/00 84/400 |
| 5,230,649 A * | 7/1993 | Robertson | ........... | A01M 31/004 446/204 |
| 5,445,551 A * | 8/1995 | Ady | ........... | A01M 31/004 446/209 |
| 5,549,498 A * | 8/1996 | Kirby | ........... | A01M 31/004 446/193 |
| 5,643,039 A * | 7/1997 | McIntyre | ........... | A01M 31/004 446/208 |
| 5,675,133 A * | 10/1997 | Kobayashi | ........... | G10K 3/00 181/188 |
| 5,803,785 A * | 9/1998 | Primos, Jr. | ........... | A01M 31/004 446/188 |
| 6,083,075 A * | 7/2000 | Meeks | ........... | A01M 31/004 181/182 |
| 6,413,140 B1 * | 7/2002 | Primos | ........... | A63H 5/00 446/202 |
| 6,767,270 B1 * | 7/2004 | Primos | ........... | A63H 5/00 446/202 |
| 7,011,564 B2 * | 3/2006 | Ady | ........... | A01M 31/004 446/209 |
| 7,637,795 B1 * | 12/2009 | Dukart | ........... | A01M 31/004 446/207 |
| 7,658,660 B1 * | 2/2010 | Drury | ........... | A01M 31/004 84/383 A |
| 8,469,765 B2 * | 6/2013 | Nolz | ........... | A01M 31/004 446/202 |
| 9,326,499 B1 * | 5/2016 | Gant | ........... | A01M 31/004 |
| 10,080,361 B2 * | 9/2018 | Thomas | ........... | A01M 31/004 |
| 2007/0037471 A1 * | 2/2007 | Pepin | ........... | A01M 31/004 446/207 |
| 2014/0065924 A1 * | 3/2014 | Dillon | ........... | A01M 31/004 446/202 |

\* cited by examiner

*Primary Examiner* — Joseph B Baldori (57) ABSTRACT

An elk call can be arranged as an air flow and aft mixing system, designed to cause the air flow to rotate and mix, creating a surround sound or echo that can create a sonic illusion that can confuse an elk as to the location of the caller.

10 Claims, 12 Drawing Sheets

FIG. 12

ELK CALL WITH INTERNAL CHAMBER

BACKGROUND

Field of the Invention

The present disclosure relates generally to elk calling. The invention pertains generally to animal calling used by hunters and other outdoorsmen to attract wild game.

Description of the Related Art

Typically when in pursuit of wild game such as elk, it is an advantage for the hunter to use a quality wild game call to simulate the various sounds emitted by the animal. This is particularly so for the archery hunter stalking and calling wild game into close proximity for a short range shot. Elk and other large game animals make a wide range of sounds and calls; it is imperative that the simulation be a true one and the hunter must be able to deliver several different calls that relate to the animal being hunted such as bull elk.

SUMMARY

This summary is not an exhaustive overview and is not intended to identify key or critical elements of the disclosure or to delineate the scope of the disclosure as set forth in the appended claims.

An illustrative embodiment of an inventive elk call of the present disclosure is directed to a wild game calling system adapted specifically for calling bull elk. In one aspect of the present invention, there is provided a four section air flow and mixing system. This shape and configuration was determined by many hours of R&D in wild elk habitat, during comparison testing with several other conventional elk calls that are designed to blow air in one end and out the other end, going straight through without mixing and rotating the air flow, which had little or no effect on the elk being called to. The shape of the inventive elk call helps mix and rotate the air flow in combination of the other parts to produce an echo sound, resulting in a more positive effect than previous elk calls.

BRIEF DESCRIPTION OF THE DRAWINGS

This disclosure may be understood by reference to the following description taken in conjunction with the accompanying drawings, in which like reference numerals identify like elements.

While the disclosure is susceptible to various modifications and alternative forms, specific embodiment's have been shown by way of example in the drawings and will be described in detail herein. However, it should be understood that the invention is not intended to be limited to the particular forms disclosed. Rather, the intention is to cover all modifications, equivalents, and alternatives falling within the spirit and scope as defined by the appended claims.

DETAILED DESCRIPTION

In the following description, reference is made to the accompanying drawings in which is shown by way of illustration specific embodiments of an inventive elk call in which the contents of this disclosure may be practiced. These embodiments are described in sufficient detail to enable those skilled in the art to practice the invention. It is to be understood that modifications to the various disclosed embodiments may be made, and other embodiments may be utilized, without departing from the spirit and scope of the disclosure. The following detailed description is, therefore, not to be taken in a limiting sense.

One advantage of the inventive elk call is its effectiveness to produce a so-called "surround sound", which can produce a sonic illusion that can impair an animal's natural ability to pinpoint the location of the caller. Previous elk calls do not provide such "surround sound".

Figure 1:
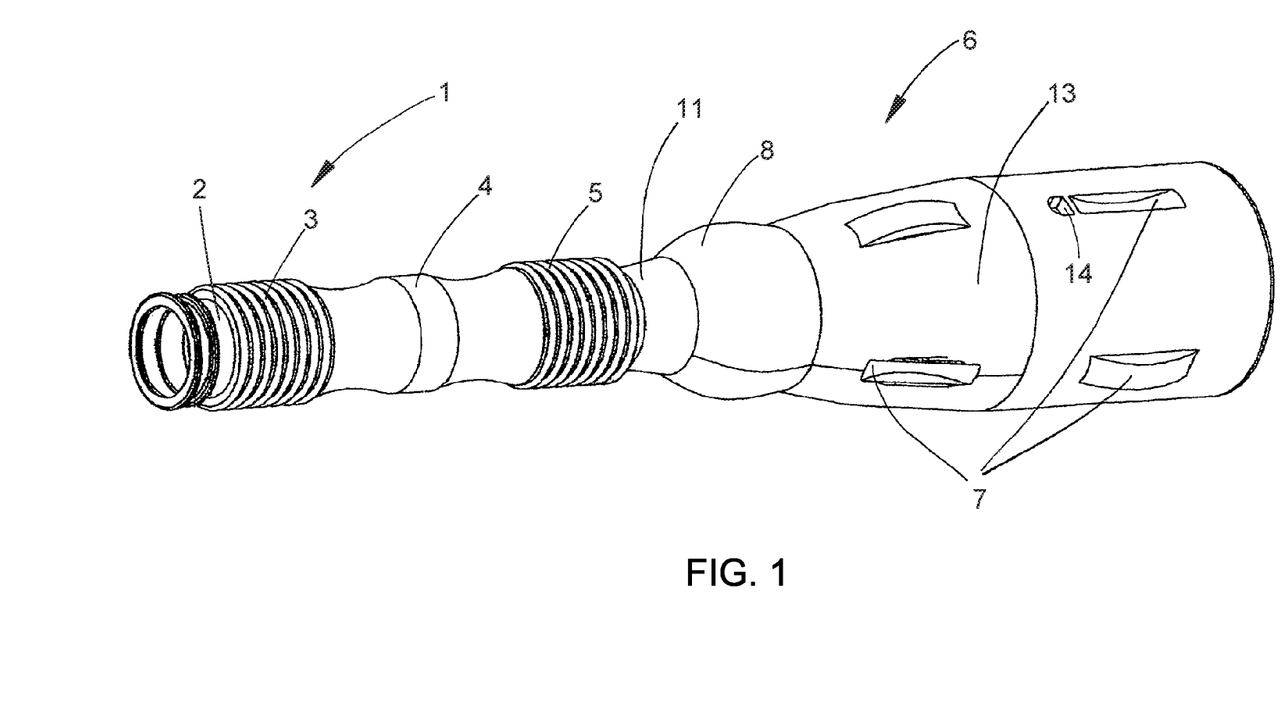
FIG. 1 is a perspective view of one illustrative embodiment of an elk call.

FIG. 1 is a perspective illustration of an example of an inventive elk call (which can be referred to as the Annihilator Elk Call), wherein the call is fully assembled. The inventive elk call is arranged to mix and rotate the air flow to produce an echo sound that can give the hunter a distinct advantage over other previous elk calls. The inventive elk call comprises an air inflow section 1 (that includes a mouthpiece 2, an upper flexible mouthpiece 3, an air and sound travel throat 4, a lower flexible connecting joint 5, and an outer chamber sleeve 11), a main chamber 6 (that includes an inner chamber sleeve 12 (not visible in FIG. 1), a first expanded chamber 8, a main outer chamber 13, and inner and outer sound indentations 7), an internal chamber section 9 (not visible in FIG. 1), and a reverberate cap 10 (not visible in FIG. 1).

Figure 2:
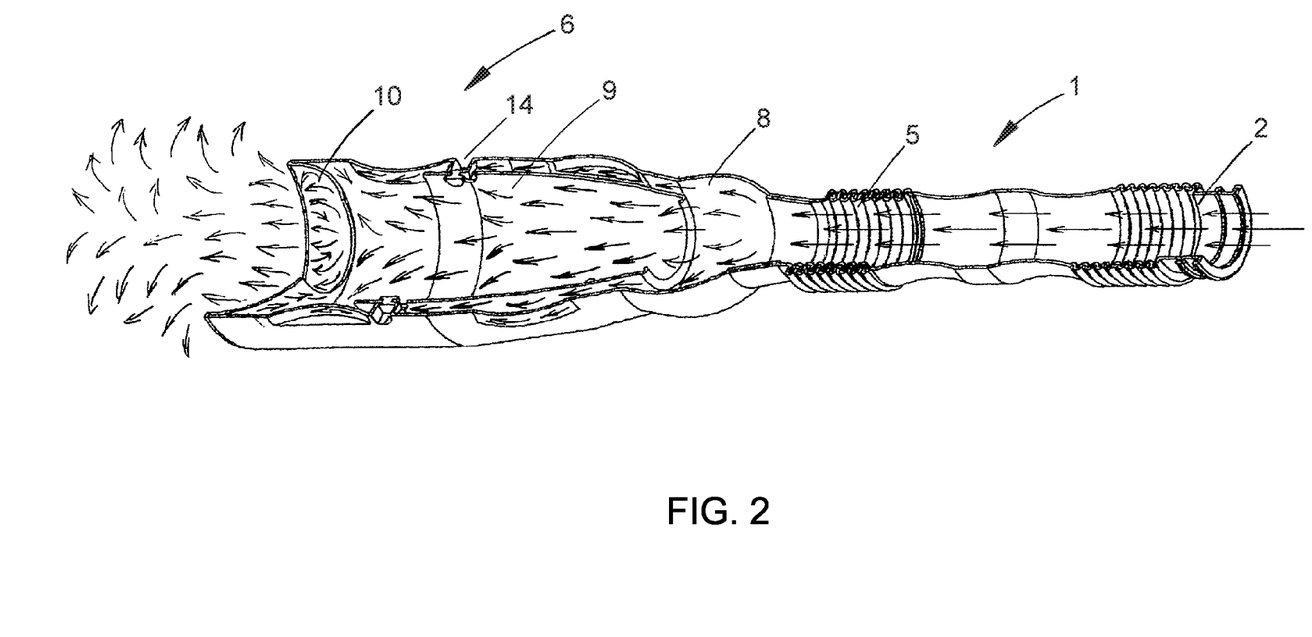
FIG. 2 is a cutaway perspective view of the elk call and the process of an internal surround sound wherein the air is mixing and traveling through all chambers.

FIG. 2 is a cutaway perspective view depicting the inventive elk call showing air flow patterns and direction of airflow that produce an echo sound that exits the elk call. The resulting non-directional illusion can prevent an elk from pinpointing the caller, which can give the human caller an advantage and allow a shot at relatively close proximity. The mouthpiece 2 is the beginning of air and sound travel through the elk call. Air is forced through the lower flexible connecting joint 5 and into the first expanded chamber 8.

Upon entering the first expanded chamber 8 the air expands around both sides and through the middle of the internal chamber section 9, which is secured in a locked state internally by engagement of the male locking studs 14 of the main outer chamber 13 with the female locking keyholes 15 of the internal chamber section 9. The air is slowed down as it travels through and around the internal chamber section 9, and slows and expands further upon entering the reverberate cap 10, so as to produce a so-called "surround sound" or an echo. The "surround sound" or echo can create an illusion as to where the sound is coming from. The air inflow section 1, the main chamber 6, the first expanded chamber 8, the internal chamber section 9 and the reverberate cap 10 are arranged so that the air flow path gradually grows wider; their sizes and their shapes are designed differently and specifically to imitate the true bull elk bugle so as to produce a blended surround stereo sound effect or an echo. The sonic illusion can misdirect the elk, which may not be able to tell where or how close the caller might be.

Figure 3:
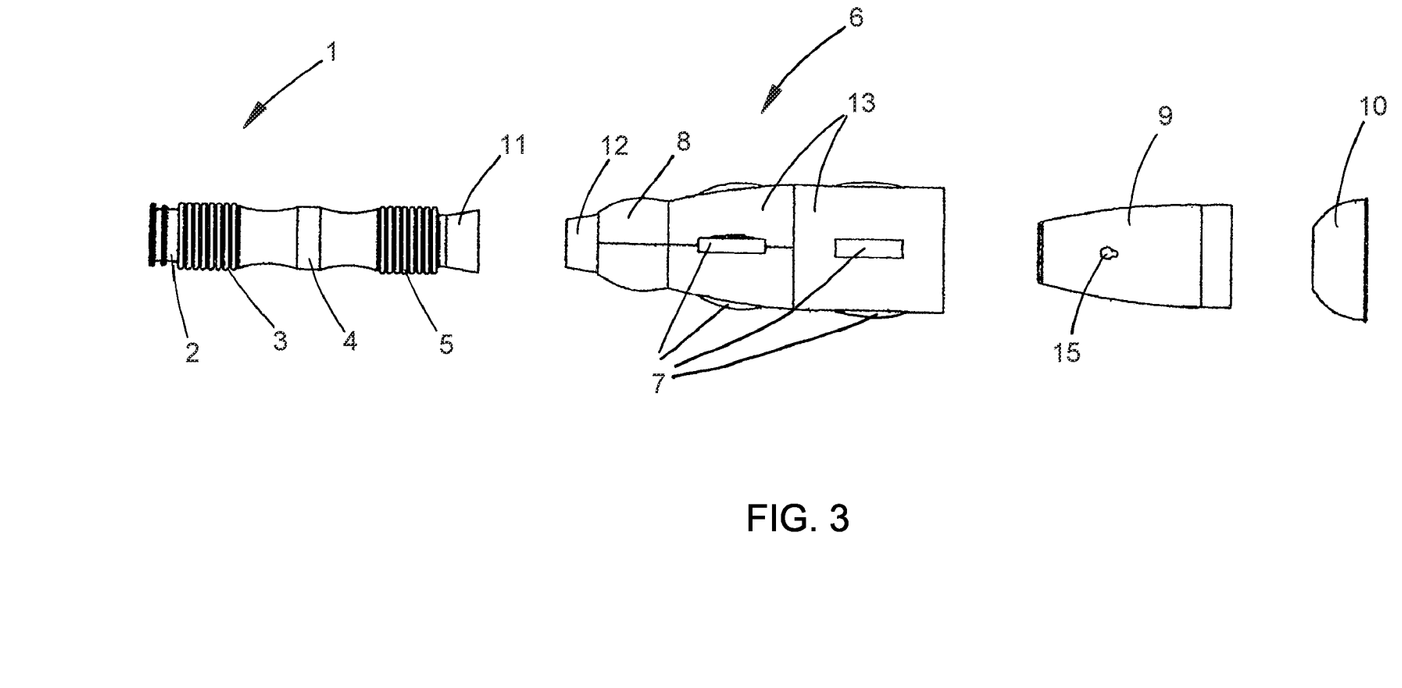
FIG. 3 is an exploded side view depicting air inflow section, first expanded chamber, main chamber, internal chamber section and reverberate cap.

FIG. 3 is an exploded side view depicting the inventive elk call. The air inflow section 1 includes five functional parts: a mouthpiece 2, an upper flexible mouth piece 3 for air and sound travel, an air and sound travel throat 4, a lower flexible connecting joint 5 and an outer chamber sleeve 11 to secure the air inflow section 1 to the main chamber 6 by a glued and pressed fit to the inner chamber sleeve 12.

Figure 4:
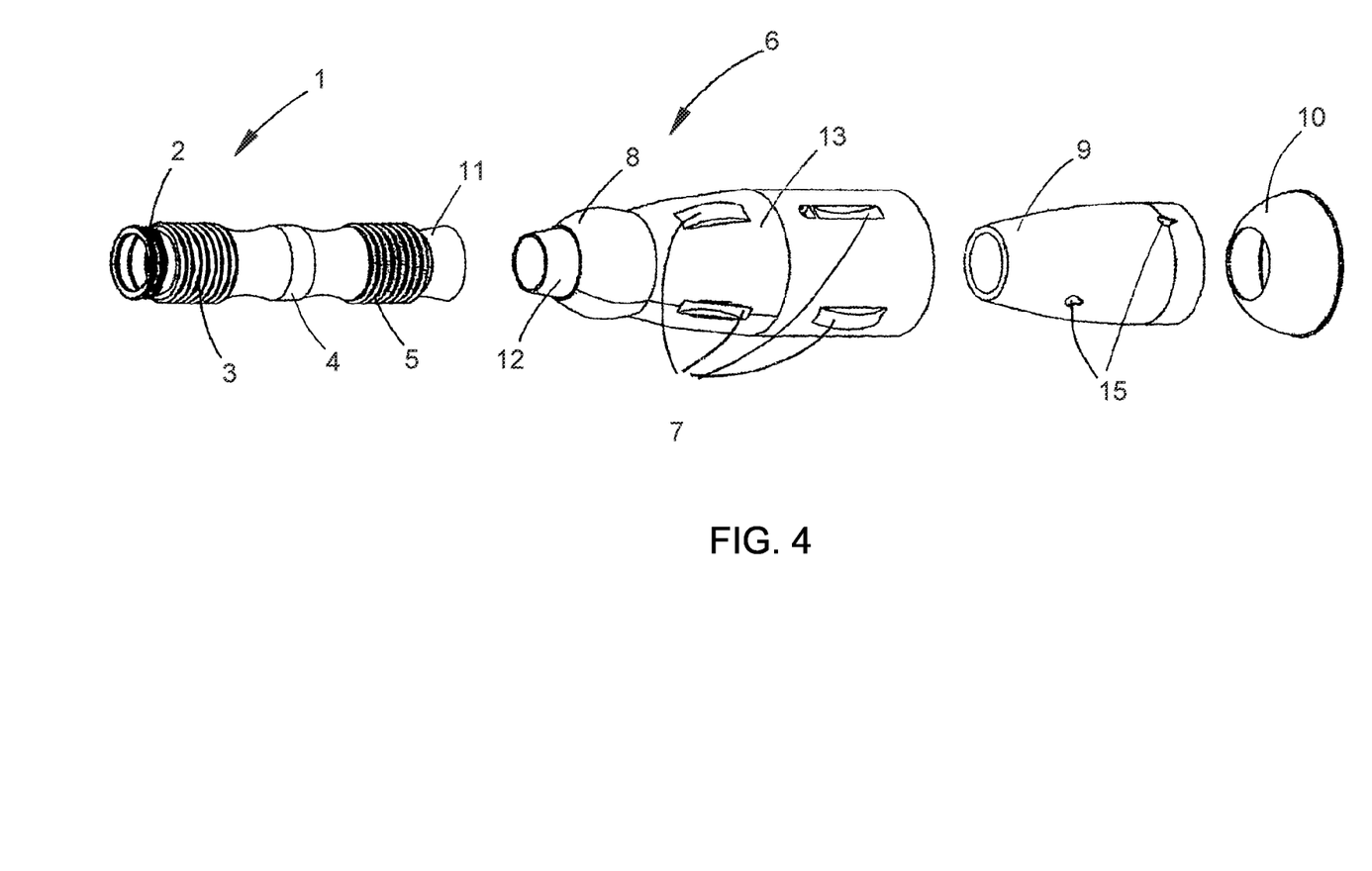
FIG. 4 is an exploded perspective view depicting air inflow section, first expanded chamber, main chamber, internal chamber section and reverberate cap.

FIG. 4 is an exploded perspective view of the inventive elk call depicting all four major sections: the air inflow section 1, the main chamber 6, the internal chamber section 9, and the reverberate cap 10.

Figure 5:
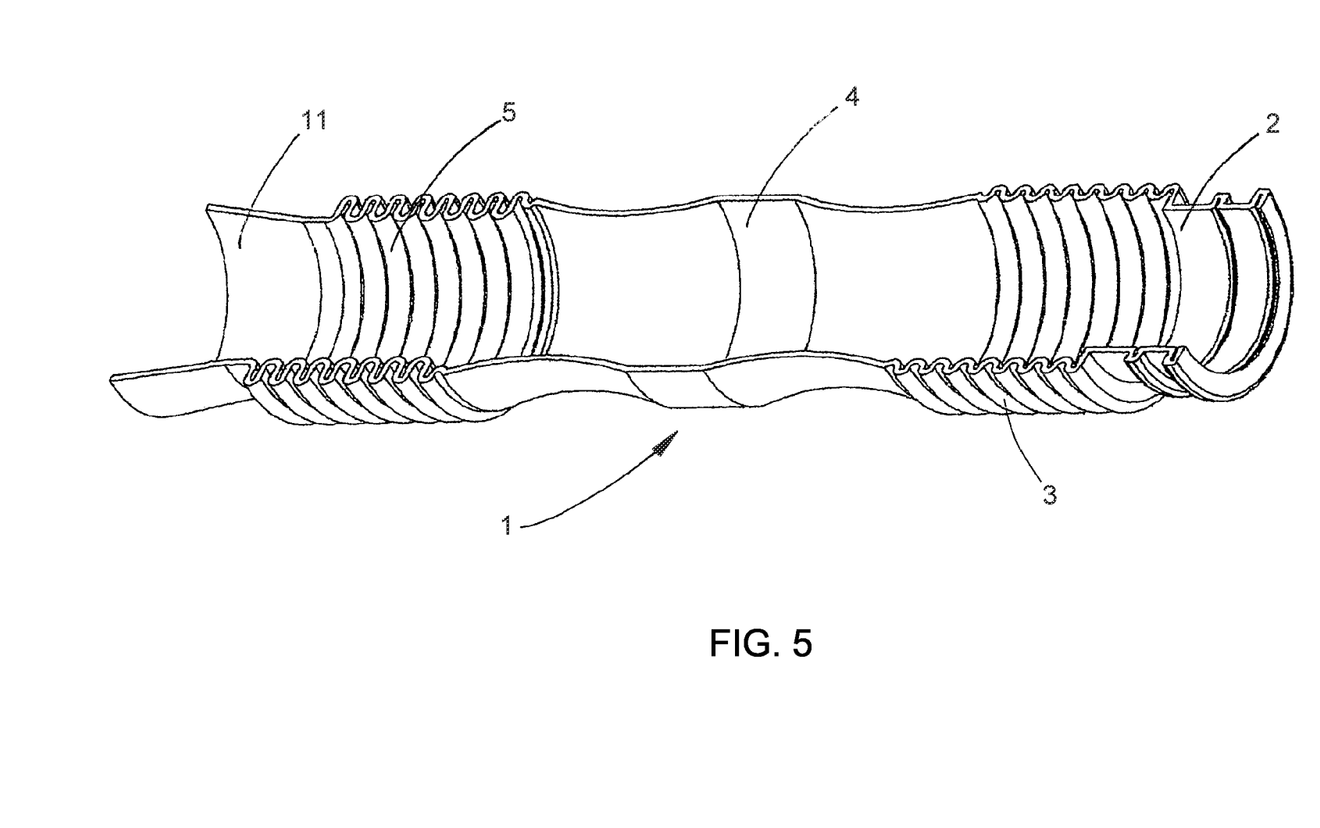
FIG. 5 is a cutaway perspective view depicting the air inflow section comprising a five-part design molded in one piece.

FIG. 5 is a cutaway perspective view depicting an air inflow section 1, wherein all elements of the air inflow section 1 are design to be molded in one piece, and wherein the upper flexible mouthpiece 3 and lower flexible connecting joint 5 are corrugated molded cylinders.

Figure 6:
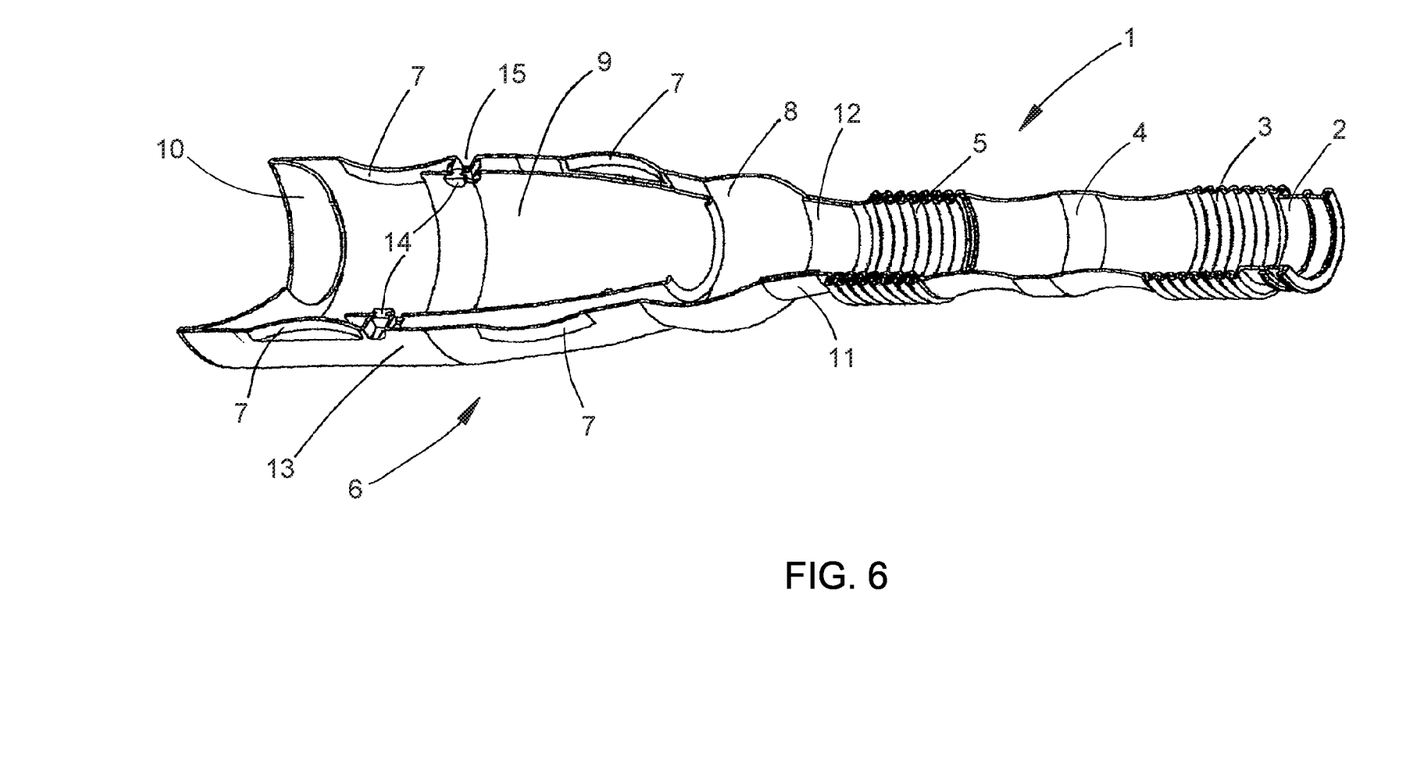
FIG. 6 is a cutaway perspective view of an elk call depicting the internal chamber section and reverberate cap connected.

FIG. 6 is a cutaway perspective view of the inventive elk call that further depicts the embodiment in an assembled state, including the internal molded male locking studs 14 engaged with the female locking keyholes 15 for a solid connection.

Figure 7:
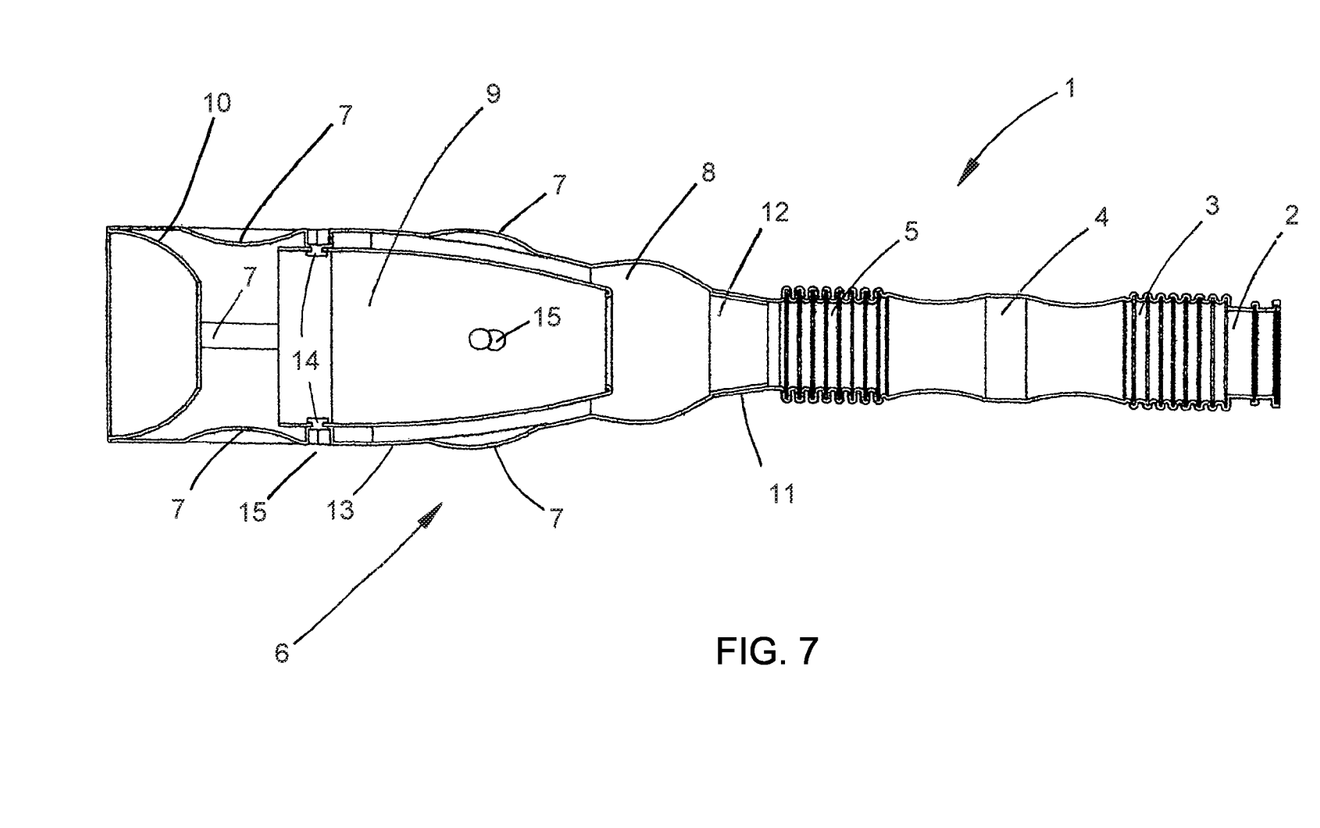
FIG. 7 is a side cross-sectional view depicting the internal chamber section and reverberate cap connected.

FIG. 7 is a side cross-sectional view depicting the alignment of the internal chamber section 9 and the reverberate cap 10 in an assembled state, wherein the reverberate cap 10 secured inside the end of the main outer chamber 13 by a glued and pressed method.

Figure 8:
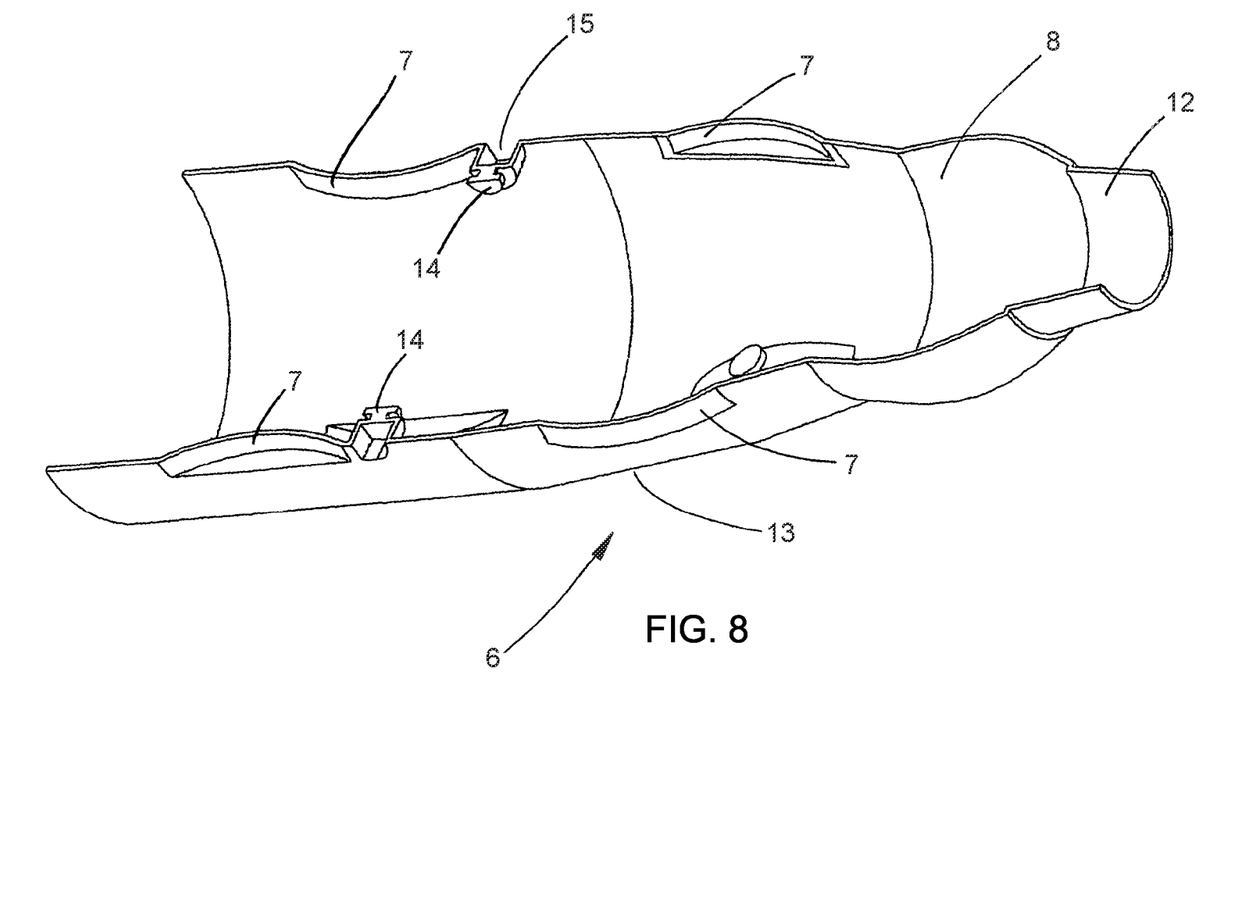
FIG. 8 is a cutaway perspective view of main chamber depicting the internal molded mail locking studs for connecting internal chamber section.

FIG. 8 is a cutaway perspective view of the main chamber 6 comprising the inner chamber sleeve 12, the main outer chamber 13, the first expanded chamber 8, the inner and outer sound indentations 7 and the male locking studs 14. Those elements are design to be molded in one piece. The male locking studs 14 are design for securing a locked state for the internal chamber section 9. Eight inner and outer sound indentations 7 are molded elongated supports to retain the molded shape of the main outer chamber 13 while being expanded outward and inward from the main outer chamber 13, which slows the air flow down enforcing movement of air and sound that further blends with air flow moving back up and from the walls of the reverberate cap 10.

Figure 9:
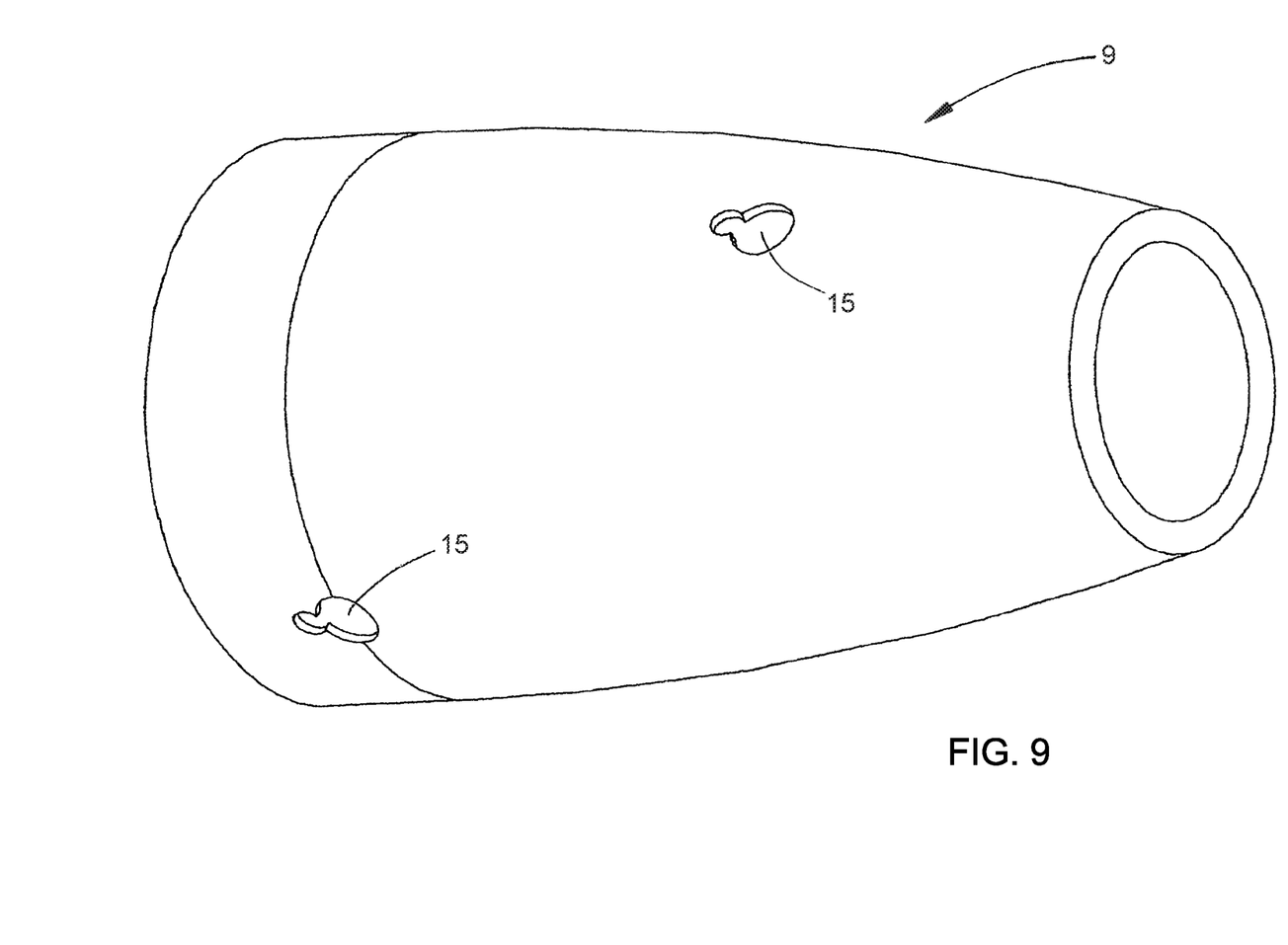
FIG. 9 is a perspective view of the internal chamber section depicting the female locking keyholes.

FIG. 9 is a perspective view of the internal chamber section 9 depicting the alignment and the female locking keyholes 15 wherein once locked secure in place, assures the air flow circulation therefore creating the surround sound effect.

Figure 10:
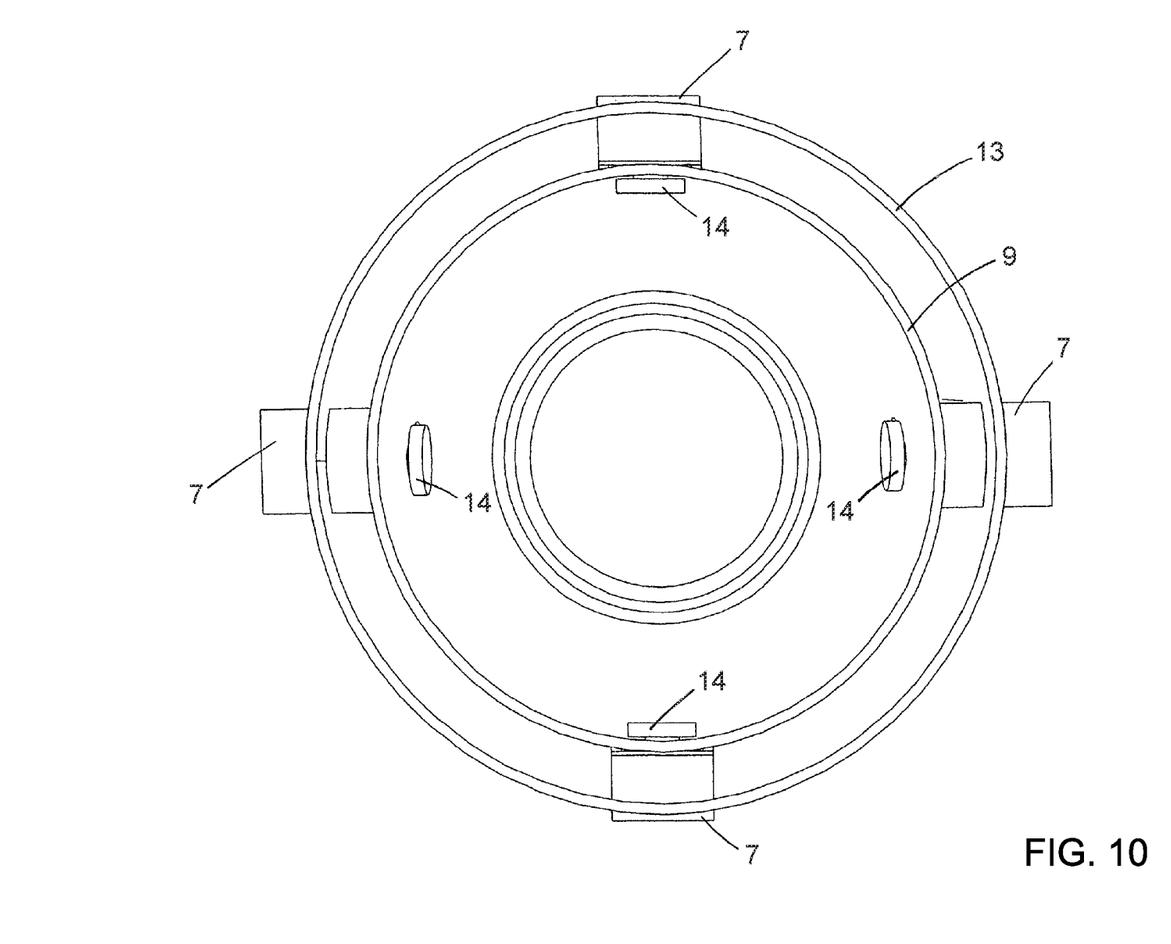
FIG. 10 is an end view of the main chamber and the internal chamber section depicting them in an assembled and locked state.

FIG. 10 is an end view of the main outer chamber 13 and the internal chamber section 9 connected in a secure state by male locking studs 14 and female locking keyholes 15.

Figure 11:
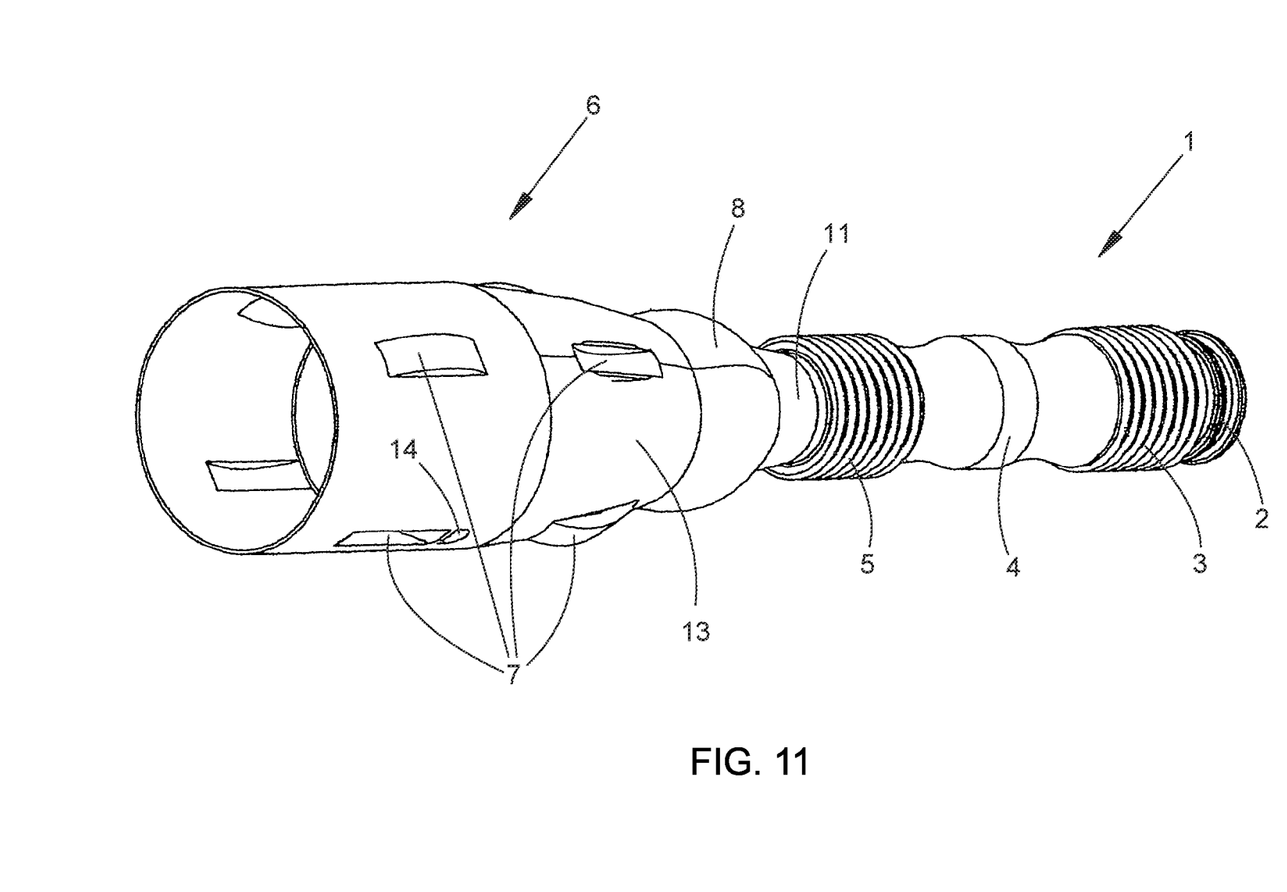
FIG. 11 is a perspective view depicting the air inflow section, the first expanded chamber, the main chamber and the internal chamber section assembled showing the open end of the main outer chamber where the reverberate cap can be connected.

FIG. 11 is a perspective view depicting an end opening of the main outer chamber 13 for a glued and pressed fit for the reverberate cap 10 therefore assuring a locked state.

Figure 12:
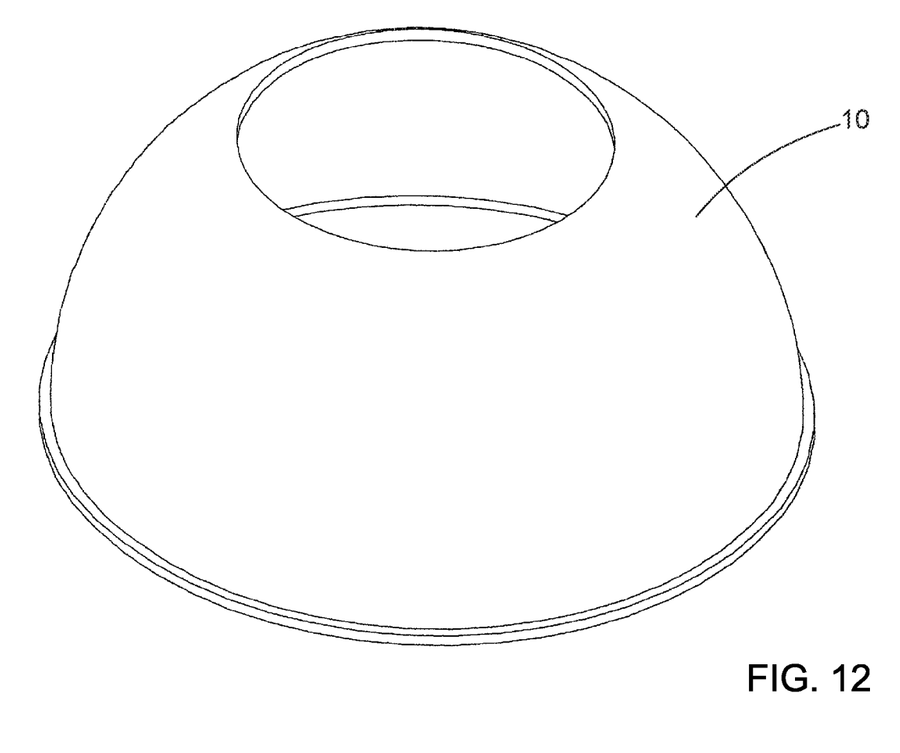
FIG. 12 is a perspective view of the reverberate cap.

FIG. 12 is a perspective view of the reverberate cap 10—the fourth element that mixes the airflow and sound to produce a sonic illusion that can impair an elk's natural ability to pinpoint the caller's location.

Although various embodiments have been shown and described herein, other embodiments that are apparent to those of ordinary skill in the art having the benefit of this disclosure, including embodiments that do not provide all of the features and advantages set forth herein, are also within the scope of the disclosure. Rather, the scope of the disclosure is defined only by reference to the appended claims and equivalents thereof.

The invention claimed is:

1. An elk call apparatus comprising:
a tubular air inflow section having open rear and front ends;
a main chamber having open rear and front ends, the rear end of the main chamber being attached to and in communication with the front end of the air inflow section to form an air passage through the air inflow section and the main chamber, the main chamber having transverse dimensions that increase toward the front end thereof;
an internal chamber section having open rear and front ends, having transverse dimensions that increase toward the front end thereof, and being positioned within the main chamber so as to leave a circumferential air flow path through the main chamber outside the internal chamber section, the rear end of the main chamber extending rearward beyond the rear end of the internal chamber section, the front end of the main chamber extending forward beyond the forward end of the internal chamber section; and
a dome-shaped reverberate cap having an outer circumference and a central opening and being attached to the main chamber at the forward end thereof with the dome-shape thereof extending rearward into the main chamber,
the air inflow section, the main chamber, the internal chamber section, and the reverberate cap being arranged so that air flowing into the rear end of the air inflow section, through the air inflow section into the main chamber, through the main chamber both around and through the internal chamber section, and out of the main chamber through the central opening of the reverberate cap results in a sound that emulates a call of an elk.

2. The elk call apparatus of claim 1 wherein the air inflow section includes one or more corrugated segments.

3. The elk call apparatus of claim 2 wherein the air inflow section includes two corrugated segments and a throat segment therebetween.

4. The elk call apparatus of claim 1 wherein the main chamber includes an expanded rearward portion.

5. The elk call apparatus of claim 1 wherein the main chamber includes one or more outwardly extending indentations and one or more inwardly extending indentations.

6. The elk call apparatus of claim 5 wherein (i) one or more of the inwardly or outwardly extending indentations are positioned on the main chamber facing a portion of the internal chamber section, or (ii) one or more of the inwardly or outwardly extending indentations are positioned on the main chamber forward of the internal chamber section.

7. The elk call apparatus of claim 1 further comprising one or more locking studs positioned within the main chamber and one or more locking keyholes positioned on the internal chamber section, the locking studs and the locking keyholes being arranged so that engagement thereof with one another secures the internal chamber section within the main chamber.

8. The elk call apparatus of claim 1 further comprising an inner chamber sleeve attached to the rear end of the main chamber and an outer chamber sleeve attached to the forward end of the air inflow section, engagement of the inner chamber sleeve within the outer chamber sleeve securing the air inflow section to the main chamber.

9. A method employing the elk call apparatus of claim 1, the method comprising blowing air into the rear end of the air inflow section so that the air flowing into the rear end of the air inflow section, through the air inflow section into the main chamber, through the main chamber both around and through the internal chamber section, and out of the main chamber through the central opening of the reverberate cap results in a sound that emulates a call of an elk.

10. The method of claim 9 wherein a surround sound or echo produced by the elk call impairs an elk's ability to locate the elk call apparatus as the source of the sound emulating a call of an elk.

\* \* \* \* \*